Figure 1:
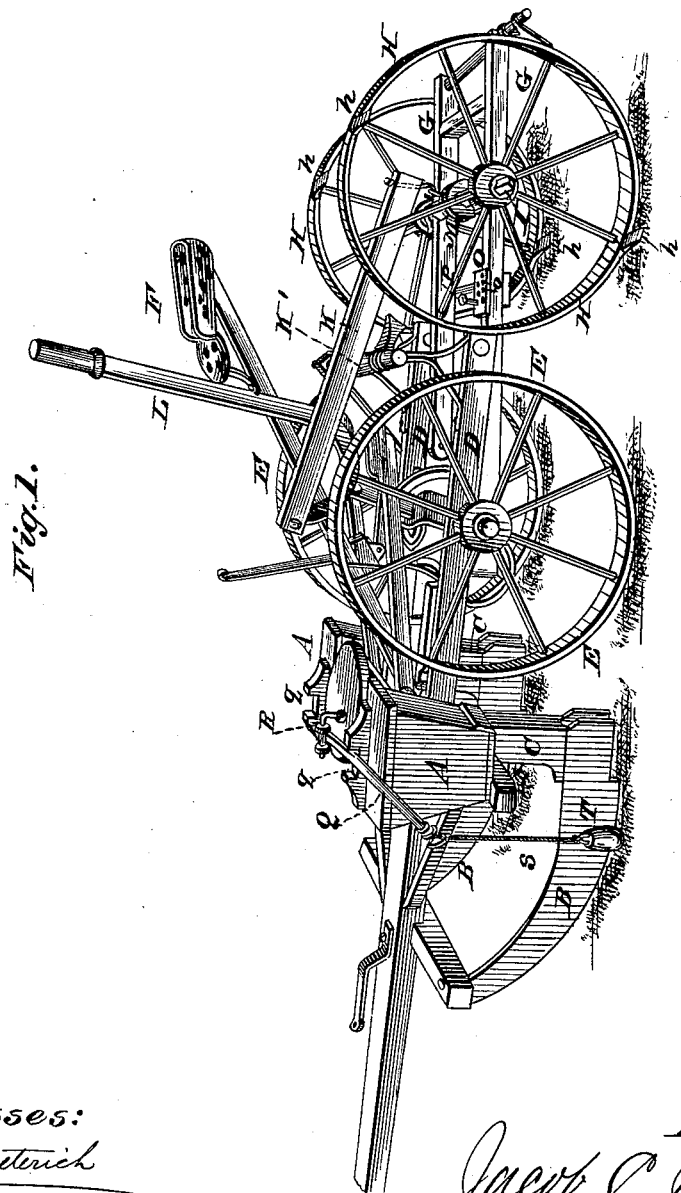
Figure 2:
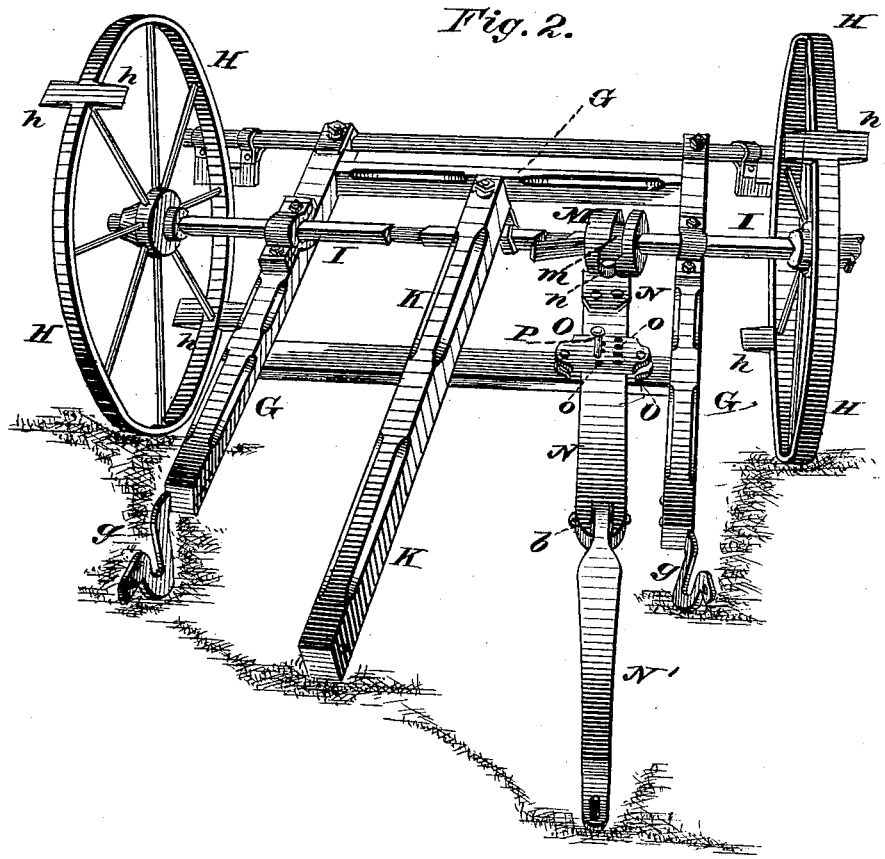
Figure 2:
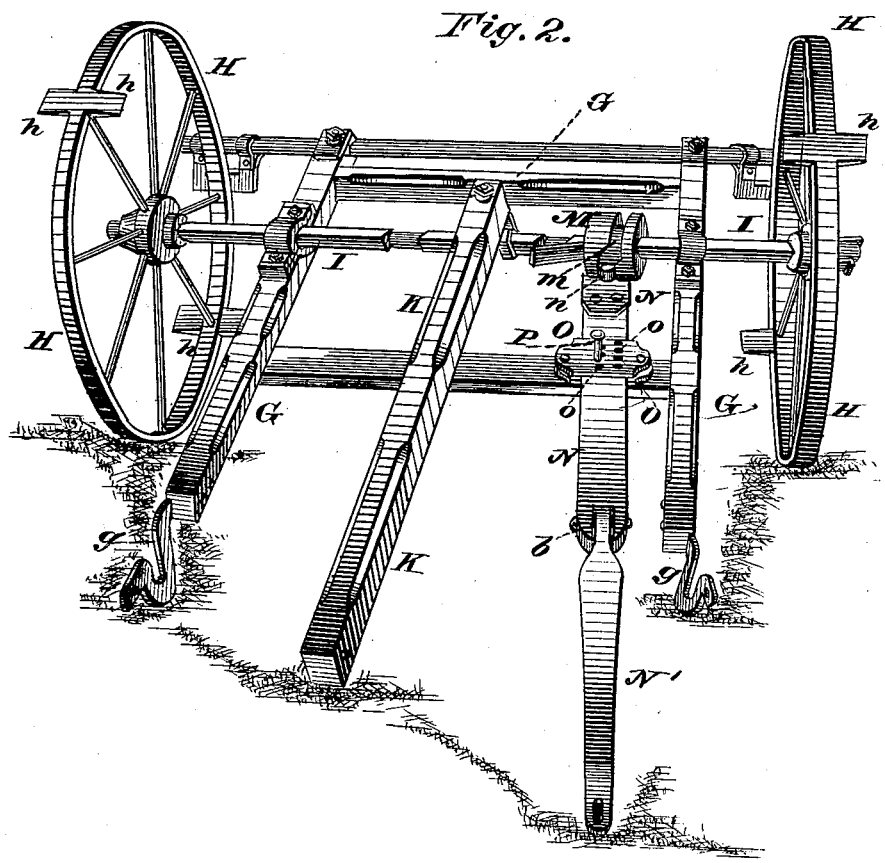

(No Model.) 2 Sheets—Sheet 2.

J. C. MUNDEL.
SEEDING MACHINE.

No. 262,460. Patented Aug. 8, 1882.

Witnesses:
Fred. G. Dieterich
P. C. Dieterich

Inventor:
Jacob C. Mundel
by Louis Bagger & Co.
Attorneys (No Model.)  2 Sheets—Sheet 2.

J. C. MUNDEL.
SEEDING MACHINE.

No. 262,460.  Patented Aug. 8, 1882.

Witnesses:
Fred. G. Dieterich
P. C. Dieterich

Inventor:
Jacob C. Mundel
by Louis Bagger & Co.
Attorneys